E. HOWLAND.
WIRE GATE.
APPLICATION FILED APR. 13, 1911.
1,020,144.
Patented Mar. 12, 1912.
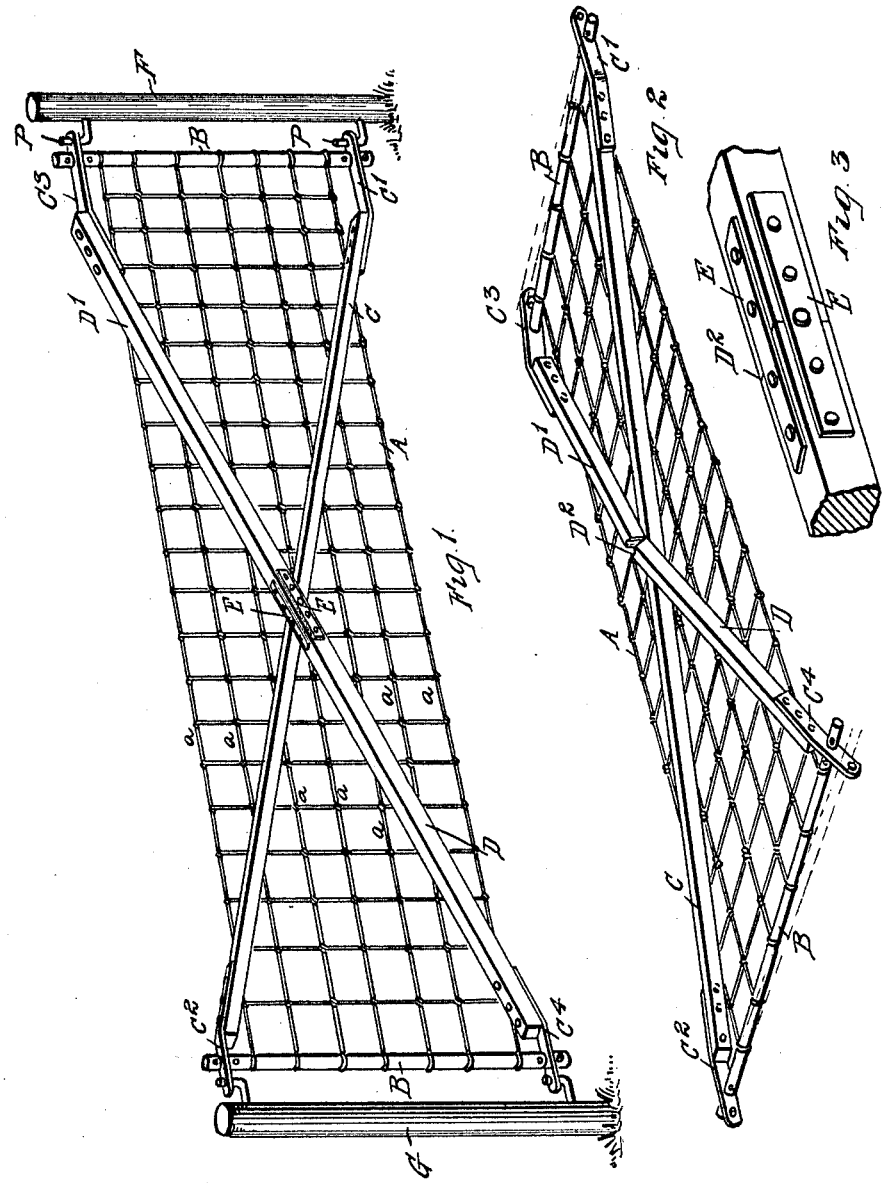
Witnesses
L. L. Bray.
V. C. Spratt.
Inventor
Ephraim Howland
By Parker V Burton
Attorneys

UNITED STATES PATENT OFFICE.

EPHRAIM HOWLAND, OF PONTIAC, MICHIGAN.

WIRE GATE.

1,020,144.  Specification of Letters Patent.  Patented Mar. 12, 1912.

Application filed April 13, 1911. Serial No. 620,752.

*To all whom it may concern:*

Be it known that I, EPHRAIM HOWLAND, a citizen of the United States, residing at Pontiac, county of Oakland, State of Michigan, have invented a certain new and useful Improvement in Wire Gates, and declare the following to be a full, clear, and exact description of the same, such as will enable others skilled in the art to which it pertains to make and use the same, reference being had to the accompanying drawings, which form a part of this specification.

My invention relates to gates made of wire netting for fencing with appropriate and peculiar framing for the purpose of rendering the same rigid as to length and height, and it consists in the construction, arrangements and combinations hereinafter claimed.

In the drawings:—Figure 1, is a perspective elevation of one form of a gate employing my invention when formed and mounted for use. Fig. 2, is a perspective of a manner of constituting, assembling and stretching and making rigid such form of gate. Fig. 3, is a detail of Fig. 2.

In the drawings, similar letters refer to similar parts.

In the drawings, A (Figs. 1 and 2) represents a wire netting which may be of rectangular form or woven in any of the approved forms, the ends of the horizontal wires $a$, $a$, being rigidly attached to two bars B, B, which are preferably round and preferably made of piping. A strut bar C is arranged with two angular metal strips $C^1$, $C^2$, and which are perforated to receive the end of the bar B with a conveniently loose fit so that the metal strips $C^1$, $C^2$ are capable of considerable angular motion with reference to the bars B, B. Two similar angular metal pieces to the strips $C^1$, $C^2$, are strips $C^3$, $C^4$, and to these are attached preferably wooden bars D, $D^1$. These are of equal length and made to abut in the center at $D^3$ as the strips $C^3$ and $C^4$ are attached by a similar form of attachment to the ends of the bars B, B, and are capable of considerable motion thereon.

In constructing the gate as already stated, the wires are attached to the bars B, B, and then are laid down loosely, the bars C with the strips $C^1$, $C^2$, are then attached at opposite ends of B, B, so that it forms an angle when the gate is erected from the top of one end to the bottom of the other end of the gate. While in this condition, there is looseness enough in the joints of the strips $C^1$, $C^2$, to the bars B, B, so that no stretching strain takes place upon the intervening wires $a$, $a$. The strips $C^3$ $C^4$, together with their bars D and $D^1$ are then attached to the opposite ends respectively of the bars B, B, and their opposite ends at $D^2$ are brought together in the manner shown in Fig. 2. The point of contact being angular while the structure is arranged as stated, the pressing down of the abutting angular ends at $D^2$, of course, lengthens the distance between the extremities at $C^3$ and $C^4$, and as the sum of the lengths of the bars D, $D^1$, have the proper ratio to the length of the bar C so that when the bars D, $D^1$, are brought into a straight line between the two points $C^3$, $C^4$, the horizontal wires $a$, $a$, are forcibly stretched and the gate is brought to a rectangular form, as shown in Fig. 1. When in this position, metal strips E, E, are bolted on the top and side of the strips D, $D^1$, at the point of junctions of $D^2$, thus making the two bars D, $D^1$, practically homogeneous and rigid. When so constructed, the gate may be hung as shown in Fig. 1 upon pintles P, P, attached to a post F and which engage in holes in the extension of the strips $C^1$, $C^3$. The opposite end of the gate may be appropriately latched or secured to a post G in any convenient manner, the hanging and securing of the gate in a closed position are not features of my invention and need not therefore be particularly described.

It is obvious that this gate may be hung to a post in any convenient manner and also retained in a closed position by any convenient means now well known in the art for that purpose, as these features are all old, it is unnecessary to describe them.

Having thus described my invention, what I desire to claim as my invention is:—

In a wire panel for gates, the combination of two vertical bars, a diagonal rigid bar non-slidably attached at one end to the upper end of one of said mentioned bars, and the lower end to the lower end of said second mentioned bar, two other diagonal bars, one end of one of which is connected to the upper end of one of said vertical bars, and one end of the other side bar is connected to the lower end of the opposite vertical bar, the two said diagonal bars equalizing in lengths the rigid diagonal bar, the two interior ends of said divided bar being brought together and forced into a straight line as a toggle joint, and detachable means for fastening the ends of said bars together, a wire fabric connecting the two vertical bars and adapted to be stretched by the toggle joint action of the two halves of said diagonal divided bars, substantially as described.

In testimony whereof, I sign this specification in the presence of two witnesses.

EPHRAIM HOWLAND.

Witnesses:
VIRGINIA C. SPRATT,
R. A. PARKER.

Copies of this patent may be obtained for five cents each, by addressing the "Commissioner of Patents, Washington, D. C."